United States Patent Office 2,769,792
Patented Nov. 6, 1956

2,769,792

FIBER-FORMING VINYL CHLORIDE COPOLYMER BLENDS WITH ACRYLONITRILE POLYMERS

George E. Ham, Dayton, Ohio, assignor, by mesne assignments, to The Chemstrand Corporation, a corporation of Delaware No Drawing. Application November 5, 1951, Serial No. 254,977

5 Claims. (Cl. 260—32.6)

This invention relates to new fiber-forming compositions. Specifically, the invention relates to modified copolymers of vinyl chloride and acrylonitrile which have superior physical properties as are hereinafter described.

It is well-known that copolymers of from 35 percent to 70 percent of vinyl chloride and from 30 percent to 65 percent of acrylonitrile are capable of being spun into fibers by solution extrusion methods. With the specified proportions of acrylonitrile present, these copolymers have superior tensile properties and at the same time are soluble in a wide variety of fiber solvents, such as acetone, other ketones and certain esters. Copolymers of this type are however objectionable in the preparation of general purpose fibers, because of the low thermal resistance and because of low solvent resistance. The prior art compositions are readily marketable because of their non-flammability and because of the low cost of the major substituent, vinyl chloride.

The primary purpose of the present invention is to provide new vinyl chloride polymeric compositions which have improved physical properties. A further purpose of this invention is to provide a superior low cost fiber-forming composition. Additional purposes of the invention will be apparent from the following description.

It has been found that the prior art vinyl chloride fiber-forming polymers, for example, copolymers of from 35 percent to 70 percent vinyl chloride and from 30 percent to 65 percent of acrylonitrile may be substantially improved with respect to their solvent resistance and softening characteristics, if they are blended with from two to 35 percent of a polymer of at least 85 percent of acrylonitrile.

Suitable acrylonitrile polymers for blending with the vinyl chloride copolymers are polyacrylonitrile and the copolymers of 85 percent acrylonitrile and up to 15 percent of other monomers copolymerizable therewith, for example vinyl acetate and other vinyl esters of monocarboxylic acids having up to four carbon atoms, styrene and other vinyl substituted aromatic hydrocarbons, vinyl chloride and other vinyl halides, vinylidene chloride and other vinylidene halides, alpha-methylstyrene and other isopropenyl substituted aromatic hydrocarbons, methyl acrylate and other alkyl acrylates having up to four carbon atoms, in the alkyl radical, methyl methacrylate and other alkyl methacrylates having up to four carbon atoms in the alkyl radical, ethyl fumarate and other alkyl fumarates having up to four carbon atoms in the alkyl group, ethyl maleate and other alkyl maleates having up to four carbon atoms in the alkyl radical, vinylpyridine and other vinyl, allyl, isopropenyl, and methallyl substituted pyridines, methylvinylpyridine, the various vinyl, allyl, isopropenyl, and methallyl substituted N-heterocyclic compounds, including those containing in addition alkyl substituents and methacrylonitrile.

The thermally stable blends of vinyl chloride polymers and high acrylonitrile polymers are prepared by mixing the polymers in the presence of a suitable solvent for both components. Suitable solvents include N,N-dimethylacetamide, N,N-dimethylformamide, gamma-butyrolactone, ethylene carbonate, a mixture of nitromethane and water, tris(dimethylamido)phosphate, and other known solvents for polyacrylonitrile.

The preparation of fibers from the new blended compositions may involve any of the fiber extrusion procedures utilized by the art in the preparation of polyacrylonitrile and other fiber-forming acrylonitrile polymers. The fibers so prepared may be stretched and heat-treated in the manner conventional for synthetic fibers.

Further details of the invention are set forth with respect to the following specific examples:

*Example 1*

A blend of 20 parts of a copolymer of 97 percent of acrylonitrile and three percent of vinyl acetate and 80 parts of a copolymer of 60 percent vinyl chloride and 40 percent of acrylonitrile was made by mixing the polymeric components in N,N-dimethylacetamide to form a 20 percent solids solution. The solution so prepared was spun into a continuous fiber by extruding through a spinneret having 30 apertures each 0.0035 inch in diameter. The fiber was spun into a mixture of 60 percent dimethylacetamide and 40 percent of water, which caused the precipitation of the polymer in solid form. The resulting fiber was continuously washed in hot water and stretched to the extent of 545 percent in a steam tube. This fiber was found to have a shrinkage of two and one-half per cent at 100° C. and only 14 percent at 240° C. The zero strength temperature of this blended fiber was 280° C.

A comparable fiber prepared from the copolymer of 60 percent vinyl chloride and 40 percent of acrylonitrile had a two and one-half percent shrinkage at 80° C., and at 100° C. a shrinkage of 20 percent. The zero strength temperature of this control fiber was 163° C.

*Example 2*

The procedure of Example 1 was repeated, except that the fiber was prepared from a blended polymer containing 90 percent of the vinyl chloride-acrylonitrile copolymer and ten percent of the acrylonitrile-vinyl acetate copolymer. This fiber shrunk 20 percent when heated to a temperature of 210° C., whereas a comparable fiber of the vinyl chloride-acrylonitrile copolymer shrunk 20 per cent at 100° C. and the zero strength temperature of this polymer was 202° C.

*Example 3*

Using the procedure described in Example 1, 85 percent of the vinyl chloride-acrylonitrile copolymer was blended with 15 percent of the acrylonitrile-vinyl acetate copolymer. Fibers were prepared from 18 percent solutions of dimethylacetamide and were stretched 290 percent. The fiber so prepared had a zero strength temperature of 271° C. and the dry shrinkage at 240° C. was only 17½ percent.

*Example 4*

The procedure of the preceding example was used to prepare fibers from a blend of 70 percent of the vinyl chloride-acrylonitrile copolymer and 30 percent of the acrylonitrile-vinyl acetate copolymer. These fibers were found to have a zero strength temperature of 314° C. and only 16 per cent dry shrinkage at 250° C.

In the above examples, the dry shrinkage was measured on the Fisher-Johns melting point block provided with a scale for determining changes in the length of the fiber as the temperature is gradually increased. The zero strength temperature was determined by suspending the fiber under slight tension and observing the minimum temperature of a metallic element which causes the fiber to break within 1.5 seconds of contact therewith.

What I claim is:

1. A new composition of matter capable of being formed into heat-stable fibers and filaments comprising a homogeneous solution containing a polymeric blend of 5 to 25 parts by weight of (A) a polymer containing at least 85% by weight of acrylonitrile and up to 15% of another polymerizable mono-olefinic monomer copolymerizable therewith, and 75 to 95 parts by weight of (B) a copolymer containing 35 to 70% by weight of vinyl chloride and 30 to 65% by weight of acrylonitrile, dissolved in a solvent selected from the group consisting of N,N-dimethylformamide and N,N-dimethylacetamide.

2. The composition as defined in claim 1 wherein the mono-olefinic monomer is vinyl acetate.

3. The composition as defined in claim 1 wherein the mono-olefinic monomer is vinylpyridine.

4. The composition as defined in claim 1 wherein the mono-olefinic monomer is methylvinylpyridine.

5. The composition as defined in claim 1 wherein (A) is polyacrylonitrile.

References Cited in the file of this patent

UNITED STATES PATENTS

| | | |
|---|---|---|
| 2,140,048 | Fikentscher et al. | Dec. 13, 1938 |
| 2,404,721 | Houtz | July 23, 1946 |
| 2,420,330 | Shriver et al. | May 13, 1947 |
| 2,420,565 | Rugeley et al. | May 13, 1947 |
| 2,688,008 | Chaney et al. | Aug. 31, 1954 |

OTHER REFERENCES

Chem. Eng. News, 29, 2552 (1951).